United States Patent

[11] 3,586,788

[72] Inventor Leo W. Page
     Potterville, Mich.
[21] Appl. No. 765,518
[22] Filed Oct. 7, 1968
[45] Patented June 22, 1971
[73] Assignee VSI Corporation
     Pasadena, Calif.

[54] METHOD OF FABRICATING MAGNETIC HEADS AND THE COMPONENTS THEREFOR
13 Claims, 4 Drawing Figs.

[52] U.S. Cl. ............................................. 179/100.2 C,
                                                29/603, 264/272
[51] Int. Cl. ...................................................... G11b 5/42,
                                                H01f 7/06, B29f 1/10
[50] Field of Search ......................................... 179/100.2
     C, 100.2 D; 346/74 MC; 340/174.1 F; 264/272;
                                                        29/603

[56] References Cited
UNITED STATES PATENTS

| | | | |
|---|---|---|---|
| 2,895,015 | 7/1959 | Zenel et al. | 179/100.2 |
| 2,920,149 | 1/1960 | Koven | 179/100.2 |
| 3,211,843 | 10/1965 | Dundovic | 179/100.2 |
| 3,233,046 | 2/1966 | Moehring | 179/100.2 |
| 3,234,338 | 2/1966 | Foster et al. | 179/100.2 |
| 3,495,048 | 2/1970 | Gooch | 179/100.2 |

FOREIGN PATENTS

| | | | |
|---|---|---|---|
| 769,651 | 3/1957 | Great Britain | 179/100.2 |
| 794,974 | 5/1958 | Great Britain | 179/100.2 |
| 874,338 | 8/1961 | Great Britain | 179/100.2 |

*Primary Examiner*—James W. Moffitt
*Assistant Examiner*—Raymond F. Cardillo, Jr.
*Attorney*—Price, Heneveld, Huizenga & Cooper ABSTRACT: A magnetic erase head formed by providing a housing having a bottom, side and end walls. The housing has integrally formed therein structural members operative to positively position and retain the transducing apparatus in a predetermined position after it has been placed therein. These structural members, in accordance with the preferred embodiment of this invention, comprise converging sections of the sidewalls which form a necked-down slot into which the core, separator and pole segments are tightly positioned. After the transducing apparatus is so positioned, the panlike housing is poured full of potting compound. The imperforate nature of the housing prevents the compound from leaking and, consequently, it may be poured full and thereafter permitted to solidify in any convenient place. Subsequent to solidification of the potting compound, the forward wall of the housing and a portion of the pole pieces utilized in the positioning process are removed by grinding or the like to form the pole faces.

PATENTED JUN 22 1971 3,586,788
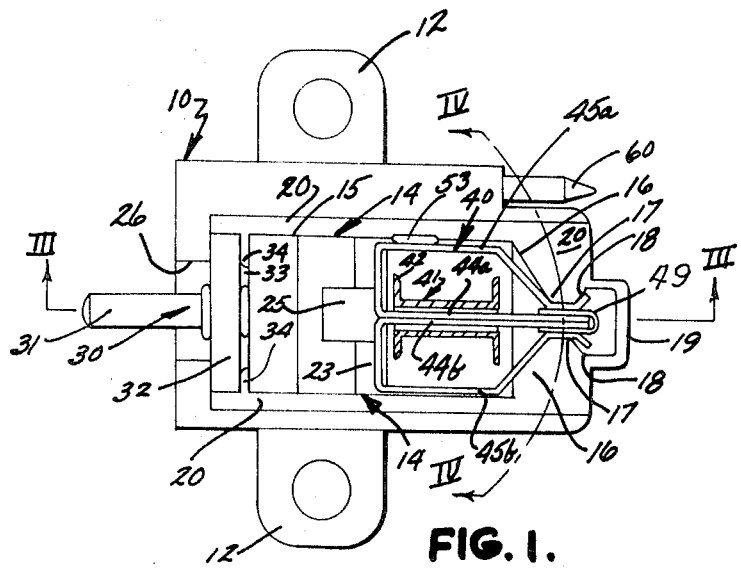
FIG. 1.
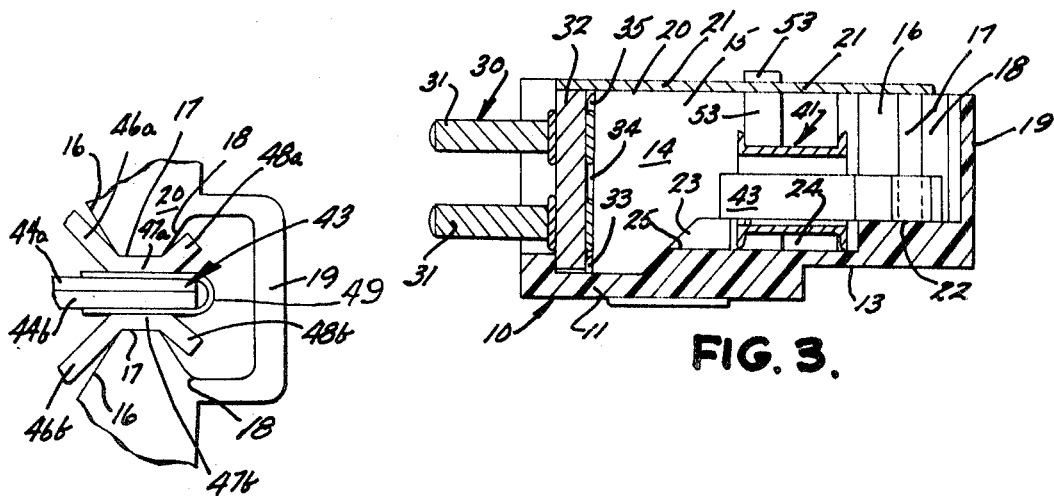
FIG. 2.
FIG. 3.
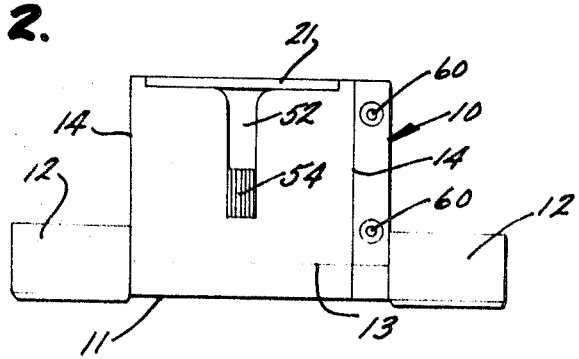
FIG. 4.
INVENTOR.
LEO W. PAGE
BY Price, Heneveld
Huizenga & Cooper
ATTORNEYS

METHOD OF FABRICATING MAGNETIC HEADS AND THE COMPONENTS THEREFOR

This invention relates to magnetic transducing heads and, more particularly, to a method of fabricating magnetic heads and the article formed thereby.

It is become customary in the fabrication of magnetic heads to retain the magnetic transducing components such as the bobbin, core and pole pieces in predetermined spacial relationship with respect to one another by embedding the assembly in potting compound. The compound, which is usually an epoxy resin, is poured around the components and allowed to solidify. Thereafter, if necessary, portions of the epoxy and pole pieces are ground away to provide the desired configuration at the pole face of the transducing head.

One of the problems which has been encountered in the manufacture of heads of the type described has been the positive positioning of the pole pieces with respect to each other and the housing within which they are contained during the potting operation. Once the potting compound solidifies, of course, it is impossible to reposition the transducing components and, if they have moved ever so slightly with respect to one another during introduction of the potting compound, the resultant head must be discarded. Another problem which has plagued the industry heretofore relates to the necessity of holding the fluid potting compound around the various magnetic components during solidification thereof in such a manner as to insure that no spaces or air bubbles are allowed to form on the interior of the compound. This latter problem is accentuated by the tendency of the liquid compound to flow away from intimate contact with the various magnetic components prior to solidification because of its liquid state.

A number of potting procedures and component-stabilizing structures have been proposed heretofore as a means of insuring effective potting of the magnetic components in their proper positions. These procedures and components, while satisfactory in the manufacture of many types of more sophisticated heads, do not lend themselves to the fabrication of simple, inexpensive heads such as the erase heads because of their complicated and expensive natures.

It is an object of this invention, therefore, to provide a potting method for transducing heads which is effective to positively position the magnetic components within the transducer housing prior to introduction into the potting compound.

It is an object of this invention, more particularly, to provide a method of the type described which, in addition to serving to positively position the transducing components, also provides a means of insuring full contact and solidification around all of the magnetic transducing components by the potting compound.

It is an object of this invention, additionally, to provide a method of the type described which is economically feasible for utilization in the fabrication of simple and, thus, inexpensive heads and, yet, which is extremely effective in insuring the production of a workable product.

It is a further object of this invention to provide a magnetic transducing head which can be manufactured relatively inexpensively and, yet, with sufficient accuracy to insure proper operating characteristics.

These as well as other objects of this invention will be readily understood by those skilled in the art with reference to the following specification and accompanying figures in which:

FIG. 1 is a plan view of the housing with the magnetic transducing components positioned therein prior to potting;

FIG. 2 is a fragmentary, enlarged plan view of the pole extremity—housing extremity section of the device;

FIG. 3 is a cross-sectional view taken along plane III-III of FIG. 1; and

FIG. 4 is a front elevational view of the novel head subsequent to completion of the potting and grinding processes.

Briefly this invention comprises a method of fabricating a magnetic transducer head and the head so formed having the steps of providing a panlike housing having imperforate bottom, side and end walls and a generally open top. The magnetic transducing components are positioned within the housing and the housing poured full of potting compound. After the potting compound has solidified, the end wall of the housing adjacent the pole piece and core extremities is ground away to expose the pole faces. Such grinding may include, additionally, removal of a portion of the core and pole pieces when such are utilized to assist in stabilization of the components within the housing prior to potting thereof.

Referring now to the FIGS. a preferred embodiment of this invention will be described in detail. FIGS. 1, 2 and 3 illustrate a magnetic erase head having a housing indicated generally by the reference numeral 10. The housing 10, preferably, is molded or otherwise formed from a suitable plastic material such as a rigid polyvinyl chloride. The housing 10 includes a base 11 from which extend lock-down tabs 12. Base 11 has a vertically offset section 13 as shown best in FIG. 3.

Extending upwardly from base 11 are sidewalls 14. Each of the sidewalls 14 include straight, parallel portions 15, converging portions 16, necked-down parallel portions 17 and diverging portions 18. The extremities of diverging portion 18 of housing 11 are connected by an enveloping portion in the manner illustrated.

The upper surfaces of sidewalls 14 are recessed in generally rectangular fashion below the plane of the top of the housing as indicated at 20. This recess, as will become apparent hereinafter, functions to receive the cover plate 21 subsequent to pouring of the potting compound into the housing.

The interior base portion of housing 10 includes a forward pole piece platform 22 and a pair of spaced rear pole piece platforms 23. The space between forward pole platform 22 and rear pole platforms 23 is left open to form a bobbin depression 24. The rear pole piece platforms 23 are separated in the manner indicated to provide a channel 25 through which the leads from the magnetic transducing apparatus pass to the terminal connector.

Into the rear face of the housing 10 is molded a rectangular opening 26. Within this opening is positioned during assembly of the head, the terminal assembly which is indicated generally by the reference numeral 30. Terminal assembly 30 comprises a terminal board 32 having external terminals 31 extending outwardly therefrom and out of the housing 10 through aperture 26. The terminal board is retained in position by a lower flange 33 and side flanges 34, which are molded preferably integrally with the housing 10. As shown in FIGS. 1 and 3, terminal board 32 is positioned within the housing during the assembly process by sliding it downwardly as viewed in FIG. 3 into the slots formed between sidewalls 14 and rear walls 27 and the flanges 33 and 34. The slots are sized such that the terminal board fits snugly therein and, thus, the housing, after insertion of the terminal board, forms a panlike container having an open top with a base, sidewalls, forward and rear walls from which the potting compound will not leak during the potting process to be described in detail hereinafter.

The magnetic transducing components, indicated generally by the reference numeral 40, include a bobbin 41 having upstanding peripheral edges 42. Through the central aperture in the bobbin is passed the core 43 which includes segments 44a and 44b. Connected to the rear extremities of each of the four segments are the pole pieces 45a and 45b. The pole pieces include converging sections 46a and 46b, parallel sections 47a and 47b and diverging sections 48a and 48b.

The core 43 and pole pieces 45 are formed, as shown best in FIG. 1, by two identical sections butted together along the facing surfaces of the core segments 44a and 44b. The bobbin structure 41 may be slid around the core 43 prior to insertion of the components into the housing by merely separating the pole pieces 45 away from their associated core segments and sliding the bobbin thereover. A segment of nonmagnetic material 49 is then folded over the extremities of the core segments 44 in the manner indicated and the pole pieces 45 moved back into abutment therewith.

Subsequent to assembly of the magnetic assembly outside of the housing 10, it is inserted into the housing in the position indicated in FIGS. 1 through 3. Such insertion is accomplished by squeezing, if necessary, the parallel sections 47 into abutment with the core 43 and sliding them into the necked-down portion of the housing 10 formed by the paralleled locking portions 17 thereof. The housing 10 is molded in such a fashion as to provide relatively critical clearance between the portions 17 and, consequently, sliding of the magnetic assembly into this area functions to insure compression of the parallel sections 47 and pole pieces 45, the nonmagnetic separator 49 and the core 43 to the desired gap width as determined by the thickness of the separator 49.

The length of parallel sections 47 of pole pieces 45, preferably, corresponds to the length of the parallel sections 17 of sidewalls 14 and, consequently, the sliding of the magnetic assembly into the housing in the manner illustrated also stabilizes the magnetic assembly longitudinally. Converging sections 46 and diverging sections 48 of pole pieces 45, nest around the corners of the parallel section 17 of the sidewalls during the insertion process.

The magnetic assembly 40 is pushed downwardly into the housing to the position illustrated in FIG. 3. During such downward movement, the lower portion of the bobbin 41 passes into the bobbin recess 24 between the forward pole piece support platform 22 and the rear pole piece support platforms 23. Downward insertion of the magnetic assembly 40 is continued until the extremities of the pole pieces 45 lie on the platforms 22 and 23 to level the assembly within the housing. The leads from the coils surrounding bobbin 41 are wired, of course, into the terminals 31 either prior or subsequent to insertion of the magnetic assembly into the housing in the manner described.

After the magnetic assembly 40 and the terminal board 32 have positioned and connected within the housing 10, the entire housing is poured full of a suitable potting compound such as any of the well-known epoxy resins currently utilized for processes of this type. This resin flows around all of the components of the magnetic assembly and, after building up above the level of the pole pieces, flows through the channel between the parallel portion 17 of sidewalls 14 into the enveloping portion 19 of the housing 10. Sufficient distance is provided, as shown in FIGS. 1 and 3, between the forward extremities of the magnetic assembly 40 and the enveloping section 19 of housing 10 to permit the potting compound to flow smoothly into and fill the area in front of and around the magnetic assembly.

Addition of the liquid potting compound is continued until it reaches a level corresponding to the level of recessed ledges 20. Upon reaching this level, a cover plate, indicated generally by the reference numeral 21, is positioned over the exposed top opening of the housing 10. Cover plate 21 includes, preferably, a depending flange 35 which abuts the terminal board 22 in the manner illustrated. The cover plate adheres to the housing during solidification of the potting compound and becomes essentially an integral part thereof.

One of the salutory features of the instant invention lies in the provision of the housing 10 which, upon insertion of the terminal board 32, is closed on all sides except its top. There are no openings, consequently, through which the potting compound can leak out of the assembly once it has been introduced so long as the housing remains oriented in the position shown in FIG. 3. Once the housing has been filled with compound in the liquid state, thus, it may be permitted to cure without fear of leakage.

As the potting compound solidifies, the pole pieces 45 become rigidly positioned with respect to one another and to the housing. Subsequent to solidification of the potting compound, thus, the gap between the core and pole faces is maintained at the predetermined spacing not only by the pressure of section 17 of the housing but, additionally, by the solidified resin or compound surrounding the entire magnetic assembly. When the potting compound 52 has solidified, the forward extremity of the housing 10 including enveloping section 19 and the forward extremity of the magnetic assembly 40 is ground or otherwise removed along a line such as indicated at IV–IV of FIG. 1. The parallel sections 47 of pole pieces 45, thus, become exposed at the pole faces, the gap with the core being positively determined by the width of the separator 49. The device, thereafter, may be secured to any suitable operating station by use of the tabs 12 and terminals 31 for use.

It is preferable in the utilization of an erase head of the type illustrated to provide a ground connection to the pole pieces 45 and, thus, the entire magnetic circuit. Such a connection may be accommodated by placing a grounding clip, indicated generally by the reference numeral 53, into the housing 10 between pole piece 45a and the side of the housing prior to introduction of the potting compound. The grounding clip 53 may, if necessary, be glued in this position either prior or subsequent to insertion of the magnetic assembly 30 into the housing in the manner described previously. A suitable opening (not shown) must be provided in the cover 21 to accommodate the clip so that it may be suitably connected to the chassis or other ground connection of the apparatus with which the erase head is utilized.

It is preferable, additionally, to provide a pair of tape guides 60 on the face of the finished head to insure passage of the tape past the pole face 54 in correct spacial relationship. These guides may be inserted, conveniently, subsequent to the grinding or removal process by providing suitable apertures within the sidewall of the housing.

While a preferred embodiment of this invention has been illustrated in detail, it will be readily apparent to those skilled in the art that other embodiments may be conceived and fabricated without departing from the spirit of this specification and the accompanying drawings. Such other embodiments are to be deemed as included within the scope of the following claims unless these claims, by their language, expressly state otherwise.

The embodiments of the invention in which I claim an exclusive property or privilege are defined as follows.

1. A method of fabricating a magnetic transducer head having the steps of:

preforming from plastic material as an integral piece a housing having at least a bottom, two sidewalls and one end wall, the sidewalls converging at a point spaced from said one end wall to form a necked-down slot having generally parallel boundaries and having a width approximately equal to the core, pole and separator segments to be positioned therein;

placing a terminal member at the end of said housing opposite from said one end such that said terminal member, base, sidewalls and one end wall form a generally fluid-tight, panlike receptacle having a generally open top;

positioning within said housing magnetic transducing components with the core, pole and separator segments thereof oriented toward said one end wall, said positioning step including the step of squeezing said pole, core and separator segments tightly together and forcing them into said slot;

pouring said panlike receptacle with the transducing components positioned therein full of liquid potting compound;

permitting said compound to solidify; and removing at least portions of said one end wall, said sidewalls and said solidified compound therebehind to expose a portion of said slot and the core, separator and pole segments positioned therein.

2. The method as set forth in claim 1 wherein said placing step includes the step of inserting a terminal board member having exposed terminals into one extremity of said housing to form one of the end walls thereof.

3. The method as set forth in claim 1 which further comprises the step of positioning a cover over said open top subsequent to pouring said compound but prior to solidification thereof.

4. A housing member for utilization in the fabrication of a magnetic transducing head including parallel pole, core and separator segments, said member being adapted to become an integral component of the head and comprising a panlike housing having a base, upstanding sidewalls and end walls, said base and walls forming a generally fluidtight, panlike receptacle having an open top, said sidewalls converging at a point spaced from said end walls to form a necked-down slot having generally parallel boundaries and having a width equal approximately to the width of said pole, core and separator segments whereby said segments can be positioned within said slot to position them with respect to said housing during potting of said transducing head.

5. The member as set forth in claim 4 wherein portions of the upper surfaces of said sidewalls are recessed to accommodate a cover plate positioned thereon subsequent to insertion of said components within said member and the filling of said member with said potting compound.

6. The member as set forth in claim 4 wherein said base, sidewalls and one of said end walls are integrally molded from plastic material and wherein said other end wall comprises a terminal strip sealed to said integrally molded sidewalls and base to form said panlike receptacle.

7. The member as set forth in claim 6 which further comprises forward and rear pole and core piece platforms affixed to said base and forming a bobbin depression therebetween and integrally molded therewith, said platforms being adapted to support pole and core piece portions at opposite extremities of a winding bobbin positioned thereover.

8. The member as set forth in claim 4 which further comprises a magnetic transducer assembly having its pole pieces positioned within said necked-down slot, the pole pieces diverging at either extremity of said necked-down slot to longitudinally position said transducer assembly within said housing member.

9. The member as set forth in claim 8 wherein the extremities of those sections of said sidewalls bounding said necked-down slot are connected by an enveloping end wall, said enveloping end wall being spaced from said necked-down slot a sufficient distance to permit said potting compound to flow thereinto after positioning of said magnetic components within said member.

10. The member as set forth in claim 9 wherein said sidewalls and the necked-down slot formed thereby are of greater height that the transducer assembly to be positioned therein whereby said potting compound can flow through said necked-down slot over said pole pieces into the space between said necked-down slot and said enveloping end wall.

11. The member set forth in claim 4 wherein one of said end walls comprises a terminal strip having means affixed thereto for the connection of said components to a signal source, said member including means for receiving said strip.

12. The member as set forth in claim 11 wherein the interior extremities of said sidewalls have grooves therein to slideably accommodate said terminal strip.

13. The member as set forth in claim 12 wherein said base also has a groove therein to slideably accommodate said terminal strip.